(12) United States Patent
Tian et al.

(10) Patent No.: US 12,317,360 B2
(45) Date of Patent: May 27, 2025

(54) SESSION CONTINUITY FOR A USER EQUIPMENT

(71) Applicant: Hewlett Packard Enterprise Development LP, Houston, TX (US)

(72) Inventors: Lu Tian, Plano, TX (US); Anders Askerup, Plano, TX (US); David C. Williamson, Plano, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 282 days.

(21) Appl. No.: 17/662,538

(22) Filed: May 9, 2022

(65) Prior Publication Data

US 2023/0363037 A1    Nov. 9, 2023

(51) Int. Cl.
*H04W 76/25* (2018.01)
*H04W 8/02* (2009.01)
*H04W 60/00* (2009.01)
*H04W 80/10* (2009.01)

(52) U.S. Cl.
CPC ............. *H04W 76/25* (2018.02); *H04W 8/02* (2013.01); *H04W 60/00* (2013.01); *H04W 80/10* (2013.01)

(58) Field of Classification Search
CPC ....... H04W 76/25; H04W 8/02; H04W 60/00; H04W 80/10
See application file for complete search history.

(56) References Cited

U.S. PATENT DOCUMENTS

2015/0208291 A1* 7/2015 Lee ................... H04W 36/0011
370/331
2020/0015079 A1* 1/2020 Li .......................... H04W 8/08

2020/0092423 A1* 3/2020 Qiao ..................... H04W 80/10
2020/0128450 A1* 4/2020 Wang ...................... H04W 4/02
2020/0153875 A1   5/2020 Karampatsis et al.
2020/0358909 A1* 11/2020 Ahmadi .............. H04L 65/1016
2021/0136658 A1* 5/2021 Rönneke ................ H04W 8/20
(Continued)

FOREIGN PATENT DOCUMENTS

EP        3503623 A1    6/2019

OTHER PUBLICATIONS

Procedures for the 5G System (5GS); Assignee / Author Affiliation:3GPP; Published: Sep. 24, 2020, 597 Pgs.
(Continued)

*Primary Examiner* — Lester G Kincaid
*Assistant Examiner* — Abdullah Al Mamun
(74) *Attorney, Agent, or Firm* — Hewlett Packard Enterprise Patent Department

(57) ABSTRACT

Examples described herein relate to techniques for session continuity when a User Equipment (UE) is moving to a destination core of a destination communication system in an interworking network architecture. Example techniques may include registering by a destination subscription manager in a Network Repository Function (NRF) a subscription profile and indicating support for a session continuity for the User Equipment (UE). Discovering the subscription profile by a source subscription manager by utilizing the NRF. Receiving the session information by the destination subscription manager from the source subscription manager based on the discovery of the subscription profile. Enabling continuity of the session by the destination subscription based on the received session information.

20 Claims, 9 Drawing Sheets

(56) References Cited

U.S. PATENT DOCUMENTS

| | | | | |
|---|---|---|---|---|
| 2021/0168585 A1* | 6/2021 | Li | ……………… | H04W 48/16 |
| 2021/0258824 A1* | 8/2021 | John | ……………… | H04W 28/0284 |
| 2021/0385706 A1* | 12/2021 | Xu | ……………… | H04W 76/16 |
| 2022/0007264 A1* | 1/2022 | Takakura | ……………… | H04W 76/18 |
| 2022/0053449 A1* | 2/2022 | Shan | ……………… | H04W 36/0066 |
| 2022/0322488 A1* | 10/2022 | Dou | ……………… | H04W 72/54 |
| 2023/0007491 A1* | 1/2023 | Smeets | ……………… | H04W 4/70 |
| 2023/0239779 A1* | 7/2023 | Speicher | ……………… | H04W 60/04 |
| | | | | 370/329 |
| 2023/0276220 A1* | 8/2023 | Wang | ……………… | H04W 60/00 |
| | | | | 370/331 |

OTHER PUBLICATIONS

System Architecture for the 5G System; Assignee / Author Affiliation:3GPP; Published: Sep. 24, 2020, 447 Pgs.

UDM and HSS not Aware of N26; Assignee / Author Affiliation: Hewlett-Packard Enterprise; Published: Apr. 8, 2020, 10 Pgs.

3GPP, "3GPP TS 23.632 V16.1.0 Technical Specification," Mar. 2020, User Data Interworking, Coexistence and Migration, Stage 2, Release 16, 43 pages.

* cited by examiner

200

REGISTER A SUBSCRIPTION PROFILE IN A NETWORK REPOSITORY FUNCTION (NRF) OF AN INTERWORKING NETWORK ARCHITECTURE INDICATING A SUPPORT FOR A SESSION CONTINUITY FOR A USER EQUIPMENT (UE) MOVING FROM A SOURCE/ FIRST CORE TO DESTINATION/SECOND CORE  205

RECEIVE SESSION INFORMATION FROM A SOURCE SUBSCRIPTION MANAGER OF THE SOURCE CORE BASED ON A DISCOVERY OF THE SUBSCRIPTION PROFILE BY THE SOURCE SUBSCRIPTION MANAGER AT THE NRF  210

SEND THE SESSION INFORMATION TO A DESTINATION MOBILITY MANAGER OF THE DESTINATION CORE BASED ON A REGISTRATION OF THE DESTINATION MOBILITY MANAGER WITH THE DESTINATION SUBSCRIPTION MANAGER  215

*FIG. 2*

SESSION CONTINUITY FOR A USER EQUIPMENT

BACKGROUND

Cellular communication systems may be widely deployed to provide various types of communication services, such as voice, video, data, messaging, broadcast, etc. With evolving communication standards, a wide variety of use cases and applications may be supported at a large scale. For example, a Fifth Generation (5G) communication system can support hundreds to millions of communication devices (e.g., mobile devices, smart sensors, etc.) within a given area. These evolving communication systems, for example, 5G, may co-exist alongside well-established communication systems, such as Fourth Generation Long Term Evolution (4G LTE) communication systems.

BRIEF DESCRIPTION OF THE DRAWINGS

The present disclosure, in accordance with one or more various examples, is described in detail with reference to the following figures. The figures are provided for purposes of illustration only and merely depict examples, wherein:

FIG. 2 illustrates an example of a method of achieving session continuity when a User Equipment moves from one communication system to another, according to the present disclosure;

Figure 1:
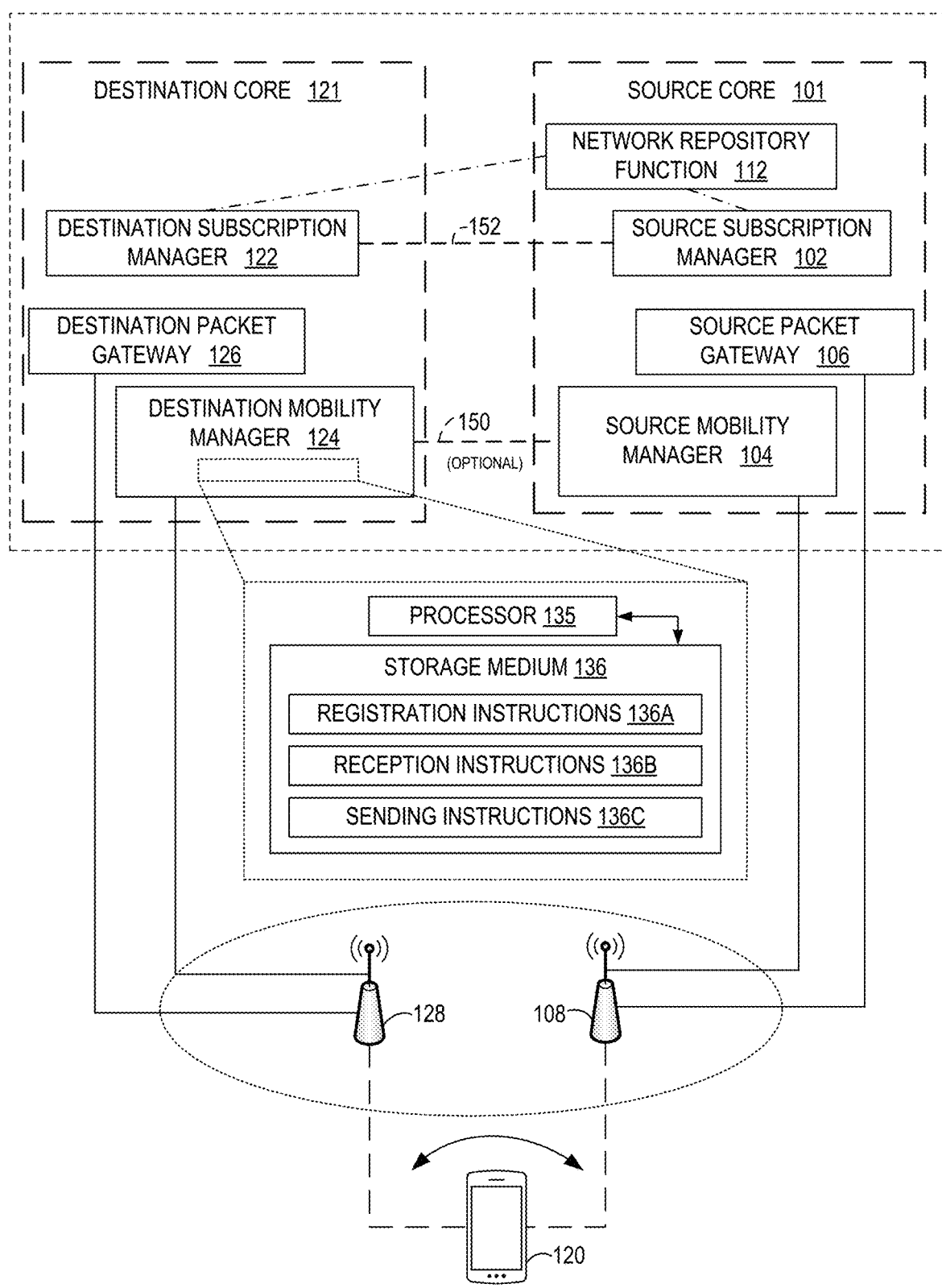
FIG. 1 illustrates a schematic view of an interworking network architecture for internetworking between 5G and 4G communication systems, according to various examples of the present disclosure.

The figures are not exhaustive and do not limit the present disclosure to the precise form disclosed.

DETAILED DESCRIPTION

With the rapid adaption of Fifth Generation (5G) communication systems, it can be envisaged to support various existing and new use cases. However, 5G may be initially expected to operate alongside well-established communication systems, such as 4G LTE (hereinafter, referred to as '4G' for brevity). Thus, an interworking network architecture with a combined 4G and 5G capability may be used to support User Equipment (UE) with different network capabilities. In certain use cases (e.g., connected cars, mobile communication devices, etc.), a UE may move from one communication system to another, which can be due to physical movement of the UE. In some other use cases, a UE may move from one communication system to another due to the availability of a stronger network. For instance, a UE may take advantage of a 5G communication system when available and may switch from 5G to 4G without interruption of services.

A communication system may include a core with one or more network nodes/Network Functions (NFs) for handling subscriptions, mobility, sessions, etc. of UE. A core of a 4G communication system may be referred to as Evolved Packet Core (EPC). Similarly, a 5G Core (5GC) may be a core of a 5G communication system. A UE may initiate a session/service, such as a voice call when connected to a core. During mobility, the UE may attach to another core. Despite such movements, session continuity may be maintained to offer uninterrupted services to a user. "Session continuity" may refer to a mechanism by which an Internet Protocol (IP) session established by a UE can survive movements to/from a core. "Survive movements" may imply, for example, maintaining sessions without dropping during mobility. A Packet Data Unit (PDU) session can be an example of an IP session and the PDU session may provide end-to-end connectivity between a UE and a Data Network (DN) for accessing an operator, an internet, or other services.

Generally, in some interworking systems for 5G and 4G, session continuity may be maintained using a standardized interface, such as an N26 interface provided between mobility managers of 5G and 4G. A session context for a UE may be transferred over such a standardized interface. In some instances, a standardized interface may be unavailable either permanently or temporarily or due to limitations associated with a UE. During such conditions, a destination mobility manager may get session information from a source mobility manager by a retrieval process. Herein, the terms starting with the word 'source' (e.g., source mobility manager) may refer to a system/component to which a UE is initially attached. The terms starting with the word 'destination' (e.g., destination mobility manager) may refer to a target system/ component to which a UE is being handed over.

Some of the existing retrieval processes for session continuity may be inefficient due to process associated delays, especially during mobility from a 5G or a non-$3^{rd}$ Generation Partnership Program (3GPP) to 4G. For instance, initially, a UE registered to 5GC may establish a PDU session. During intersystem mobility, the UE may move from 5GC and attach to an EPC. That is, the UE may attach to a destination mobility manager (e.g., Mobility Management Entity (MME)) of EPC. The destination mobility manager may notify UE's registration and obtain subscription information by registering with a destination subscription manager (e.g., Home Subscriber Server (HSS) of EPC). Further, the destination subscription manager may obtain UE's mobility management/context information from 5GC if the UE has an ongoing PDU session. An ongoing PDU session may be referred to as an active PDU session. In some instances, the destination subscription manager (e.g., HSS) may either retrieve session information or subscribe-to-benotified with a source subscription manager (e.g., a Unified Data Management (UDM)) of any modification to session information. For instance, retrieval of session information may include obtaining UE context data and/or intersystem context continuity data (e.g., using Nudm_SDM_Get Request/Response) from a source subscription manager, when a destination subscription manager receives a request from a destination mobility manager. In some of such conventional systems, retrieval and/or subscribe-to-be-notified process may be performed as per Technical Specification (TS) for $3^{rd}$ Generation Partnership Program (3GPP)—TS 23.632 V 16.5.0 (2021 March). Specifically, section 5.3.4 of the TS discusses "Support for PDU session continuity during interworking mobility procedures." As alluded earlier, interaction for session continuity in some of the conventional systems may be inefficient, as a destination subscription manager may wait for a response from a source subscription manager for session information. This may create a delay in handing over session information. Moreover, the delay created by some of the existing processes may affect network service(s), especially considering low latency and high throughput specifications for certain use cases. For instance, certain high-speed or very high-speed mobility use cases (e.g., public and personal transport applications, etc.) may rely on communication systems to provide services to users and such services may exhibit poor performance.

Examples of the present disclosure provide techniques related to session continuity during mobility of a UE from a source communication system to a destination communication system in an interworking network architecture. For example, the source communication system can be one of a 5G or a non-3GPP communication system, and the destination communication system can be a 4G communication system. According to some examples of the present disclosure, a destination subscription manager may actively register a subscription profile in a Network Repository Function (NRF) to aid in efficient session continuity during mobility. NRF can be a Network Function (NF) of the interworking network architecture and support registration and discovery of an NF instance(s). In some examples, an NF instance can be a virtual or physical logical network function that can perform functions, such as calculation, storage, and/or network communication operations. The NF instance can be an NF instance of components of a core (e.g., an AMF and a UDM), an NF instance of a subscription profile (e.g., an HSS profile), or the like. A source subscription manager can discover the subscription profile and send session information of the UE to an appropriate destination subscription manager. A "subscription profile" may be an example of a subscription profile and may include information related to identification, subscription, and/or network location of a UE.

According to some examples, when a UE attaches to a source mobility manager, the source mobility manager may register at a source subscription manager. Further, the UE may create a session for availing a network service in the source mobility manager. The source mobility manager may register such session information in a Session Management Function (e.g., a combined Control plane Packet Data Network Gateway (PGW-C) and Session Management Function (SMF)). The Session Management Function may register the session information in the source subscription manager. The source subscription manager may discover a subscription profile based on a registration of the subscription profile with an NRF by the destination subscription manager. In response to such discovery, the source subscription manager may send corresponding session information to the destination subscription manager. In some examples, the destination subscription manager may store the received session information, irrespective of a registration of a destination mobility manager with the destination subscription manager. Otherwise, a destination subscription manager may subscribe at a source subscription manager. When subscribed, the destination subscription manager may be notified by the source subscription manager of context data or session information. Moreover, the destination subscription manager may perform the aforementioned subscription-notification process after a destination mobility manager sends a request to the destination subscription manager, which can cause a delay in obtaining the session information.

The present disclosure enables a source subscription manager to actively intimate a destination subscription manager regarding session information, irrespective of a registration of a destination mobility manager with the destination subscription manager. Using techniques of the present disclosure, the process of retrieval/subscription-notification for session information can be avoided for obtaining session information. Moreover, the time taken for a UE registration during mobility from 5GC to EPC may be reduced by 15-50 times when compared to some of the known processes of registration. For example, registration using a conventional subscription-notification process may take about 100 milliseconds. Whereas, the registration time may be reduced as per the techniques of the present disclosure, e.g. by six milliseconds. Accordingly, a quicker response time can be achieved that enables use cases, such as high-speed mobility, or high precision applications, to perform with low latency.

According to some examples, an interworking network architecture may include various Network Functions (NFs)/network nodes from 5GC and EPC. In an example, a destination subscription manager can be a Home Subscriber Server (HSS), a source subscription manager can be a Unified Data Management (UDM), and a subscription profile can be a Home Subscriber Server (HSS) profile. In some examples, a UDM may perform an HSS discovery based on the registration of an HSS instance. The UDM may send information, such as Fully Qualified Domain Name (FQDN), Access Point Name (APN), etc. efficiently to an appropriate HSS. Further, the HSS may receive and store intersystem continuity context data or UE context data when such data may be created/changed at the SMF.

In some other examples, a UE may move to a 4G network from a non-3GPP communication system. The UE may attach to an evolved Packet Data Gateway (ePDG) of an interworking network. The ePDG may register at a subscription manager. The UE may create a session at the ePDG and the ePDG may register such session information in a combined Control plane Packet Data Network Gateway (PGW-C) and Session Management Function (SMF). The session information may be registered in UDM. The UDM may discover an HSS profile in an NRF based on a registration of the HSS profile by an HSS. The UDM may send session information to the HSS. In other words, the HSS may receive and store the session information from the UDM.

The following detailed description refers to the accompanying drawings. Wherever possible, the same reference numbers are used in the drawings and the following description to refer to the same or similar features. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

Before describing examples of the disclosed techniques in detail, it is useful to describe an example of interworking network architecture with which these techniques might be implemented in accordance with various examples. FIG. 1 illustrates a schematic view of an interworking network architecture 100 for a first communication system and a second communication system. The interworking network architecture 100 illustrates selected, non-limiting components, of cores of the communication systems. In the current example, the first communication system and the second communication system may be a 5G communication system and a 4G communication system, respectively. In another example, the first and the second communication systems can be from existing or future communication systems, such as 4G, 5G, Sixth Generation (6G) communication systems, and so forth. Herein, the terms 'first' and 'source' may be interchangeably used. Similarly, the terms 'second' and 'destination' may be interchangeably used. Further, a UE may be equipped to operate in either of the communication systems and may move from one communication system to another.

For example, the interworking network architecture 100 includes a source core 101 and a destination core 121. The source core 101 and the destination core 121 can be cores of the first communication system and the second communication systems, respectively. In a further example, the source core 101 and the destination core 121 can be a 5GC and an EPC (as defined in the 3GPP), respectively. In some examples, the cores 121, 101 may enable various UEs to access circuit-switched networks, to facilitate communications between a UE and earlier 3GPP network standards, or land-line communication devices. According to various examples, a UE may be a communication device, such as a computing device, laptop, tablet computer, smartphone smart television, smart sensor, security device (e.g., security camera), vehicle control system, network device, remotely piloted aerial vehicle (e.g., drone), or the like. Further, when connected to the first communication system, a UE may leverage offered network features, such as high bandwidth and low latency.

The first communication system may include a transceiver station 108 with one or more transceivers for a wireless interface with at least one UE. The transceiver station 108 can be a gNodeB. The gNodeB may be a 3GPP-compliant implementation of a base station for a 5G communication system.

The source core 101 may include various NFs including, inter alia, a source subscription manager 102, a source mobility manager 104, and a source packet gateway 106. In an example, the source subscription manager 102 can be a Unified Data Management (UDM), the source mobility manager 104 can be an Access and Mobility Management Function (AMF), and the source packet gateway 106 can be a User Plane Function (UPF). When a UE attaches to the first communication system, the UE may attach to the source mobility manager 104. The source mobility manager 104 may register at a source subscription manager 102 for authorizing access to the UE. Whereas, the source subscription manager 102 may store subscription data and/or policy data associated with a user. Based on such data, the source subscription manager 102 may perform user identification, access authorization, service/session continuity, subscription management, etc.

Out of the NFs of the source core 101, the source mobility manager 104 may be connected to each of the transceiver stations 108 (e.g., gNodeBs). The source mobility manager 104 may perform access control and mobility management for UEs that are connecting to the source core 101. Further, the source packet gateway 106 may handle various user plane functions associated with a UE. User plane functions may include mapping IP packets to Quality of Service (QOS) flow, forwarding packets, traffic measurement, etc. The source packet gateway 106 may provide policies to NFs for the handling of UE's session.

Similarly, the second communication system may include a transceiver station 128. In an example, the transceiver station 128 can be an Evolved NodeB (eNodeB) configured for a wireless interface with at least one UE. The transceiver station 128 may be configured to support a plurality of UEs within a given network coverage area. A network coverage area may be alternatively referred to as a cell. In some examples, the transceiver station 128 may include Multiple Input-Multiple Output (MIMO) technology and may support UE from multiple cells. In some examples, the transceiver station 128 may be part of a Radio Access Network (RAN) and a RAN may include one or more controllers that may be connected to one or more transceiver stations. A RAN may be communicably coupled to one or more cores (e.g., one or more EPCs). The transceiver stations 128 and 108 may not directly interact with each other, but interaction may occur between their respective cores (e.g., destination core 121 and the source core 101).

The destination core 121 may include multiple nodes/NFs that include, inter alia, a destination subscription manager 122 (e.g., an HSS), a destination mobility manager 124 (e.g., an MME), and a destination packet gateway 126 (e.g., a Service Gateway (SGW)). In some examples, one or more of these NFs may be implemented on dedicated hardware, as a software instance running on dedicated hardware, or a virtualized function instantiated on a platform, such as cloud, container-orchestrator, or a combination of one or more. Further, the NFs may communicate with each other directly via an interface or through an intermediate NF.

Further, the destination subscription manager 122 may be a database that contains subscription information of various users that are connected to the second communication system. In some examples, the subscription information may include user identification information, such as International Mobile Subscriber Identity (IMSI), Mobile Subscriber Integrated Services Digital Network Number (MSISDN), a telephone number, service subscription information, Quality of Service (QOS) information subscribed by a user, etc. Further, the destination subscription manager 122 may provide authentication and security information for the UE 120 to connect to the destination core 121.

The destination packet gateway 126 may perform user plane functions, such as routing/forwarding user data packets to/from the UE 120. In some examples, the destination packet gateway 126 may be a mobility anchor for inter-transceiver handovers. The destination packet gateway 126 may be an anchor for mobility between second and first communication systems, as per the ongoing example. The destination packet gateway 126 may be coupled to a Packet Data Network Gateway (PGW) (not shown). The PGW may enable the UE 120 to access packet-switched networks to facilitate communication among UEs and IP-enabled devices.

In some examples, an N26 interface 150 may be optionally provided between the mobility managers 124, 104 for handing over a UE (e.g., the UE 120) during mobility. In some examples, mobility of a UE device may occur in absence of an N26 interface 150. Moreover, a UE may have an ongoing session on a first communication system and the UE may move from the first communication system to attach to a second communication system. For example, the ongoing session may correspond to a call using Voice-over-IP, a streaming service, a file download, a chat service, etc. The ongoing session may be maintained for uninterrupted services. In an example, during mobility, core networks may have to maintain an IP address allocated to a UE for session continuity and a session context may be offered to NFs of a destination/receiving core.

According to some examples, the destination mobility manager 124 can be a computing device, a physical or virtual server, a Virtual Network Function (VNF) that includes a processor 135, and a storage medium 136 storing instructions (e.g., instructions 136A-136C). The instructions may be executable by the processor 135 for performing session continuity during mobility of the UE 120 to the destination core 121.

The processor 135 may execute registration instructions 136A to register a subscription profile in the Network Repository Function (NRF). The subscription profile may indicate support for a session continuity for the UE 120 moving to the destination core 121 during mobility.

Further, the processor 135 may execute reception instructions 136B to receive session information from the source subscription manager 102 based on a discovery of the subscription profile by the source subscription manager 102. In some examples, the session information may correspond to an ongoing network connection. The term "ongoing network connection" may be alternatively referred to as an "active network connection," as per some examples.

Furthermore, the processor 135 may execute sending instructions 136C to send the session information to the destination mobility manager 124, in response to the destination mobility manager 124 registering with the destination subscription manager 122.

A method of achieving session continuity with improved mobility when moving from 5GC to EPC is illustrated in the example method 200 of FIG. 2. In some examples, the method 200 may comprise a plurality of blocks and one or more blocks may correspond to one or more instructions. The instructions may be executable by a processor (e.g., the processor 135) to perform efficient handling of session continuity. In the following description for FIG. 2, reference may be made to the interworking network architecture 100 of FIG. 1.

Initially, the UE 120 may register to the source core 101 (e.g., 5GC) and establish a network connection, such as a PDU session. A network connection may indicate an association between the UE 120 and a source wireless communication system. Further, the network connection may enable data connectivity between the UE 120 and a Data Network (DN). During mobility to the destination core 121 (e.g., EPC), the UE 120 may trigger an attach request with the destination core 121. In an example, the UE 120 may create a PDU session corresponding to a network service when it is attached to the source core 101. During mobility, the UE 120 may attach to the destination core 121, and the PDU session may be transferred to the destination core 121 as per the techniques of the present disclosure.

According to some examples, at block 205, the destination subscription manager 122 may register at a Network Repository Function (NRF) 112 of an interworking network architecture by indicating that it supports session continuity when the UE moves from a source core to a destination core (e.g., 5GC to EPC). In an example, destination subscription manager 122 may register a subscription profile in the NRF.

A "subscription profile" may provide information about services offered by a service provider for a subscriber. In an example, the services offered include, inter alia, support for session continuity. The NRF may serve as a repository for NFs and support a service discovery function. For example, the NRF may receive a discovery request for an NF instance and may provide information about a discovered NF instance to a requestor. Further, the NRF may also maintain the NF profile of available NF instances and their supported services.

At block 210, the destination subscription manager 122 may receive session information, from the source subscription manager 102 based on a discovery of a subscription profile at the NRF. For example, when session information (e.g., PDU session) may be created/changed in the source mobility manager 104, the source mobility manager 104 may post a session context in a Session Management Function (e.g., PGW-C+SMF). The Session Management Function may register at the source subscription manager 102. Based on session context, the source subscription manager 102 may discover the subscription profile and send the session information to the destination subscription manager 122. Thus, the destination subscription manager 122 may receive the session information.

The destination subscription manager 122 may store the session information regardless of destination mobility manager registration with the destination subscription manager 122. At block 215, based on the registration of a destination mobility manager 124 with the destination subscription manager 122, the destination subscription manager 122 may send the session information to an appropriate destination mobility manager. The destination mobility manager 124 may manage a particular area within which the UE 120 happens to be located. In an example, the destination mobility manager 124 may select an appropriate serving gateway from for the UE 120. The destination mobility manager 124 may authenticate an end-user (e.g., a user of the UE 120). Based on authorization and/or service permissions/restrictions, the UE 120 may continue the session with the destination core 121.

Figure 3:
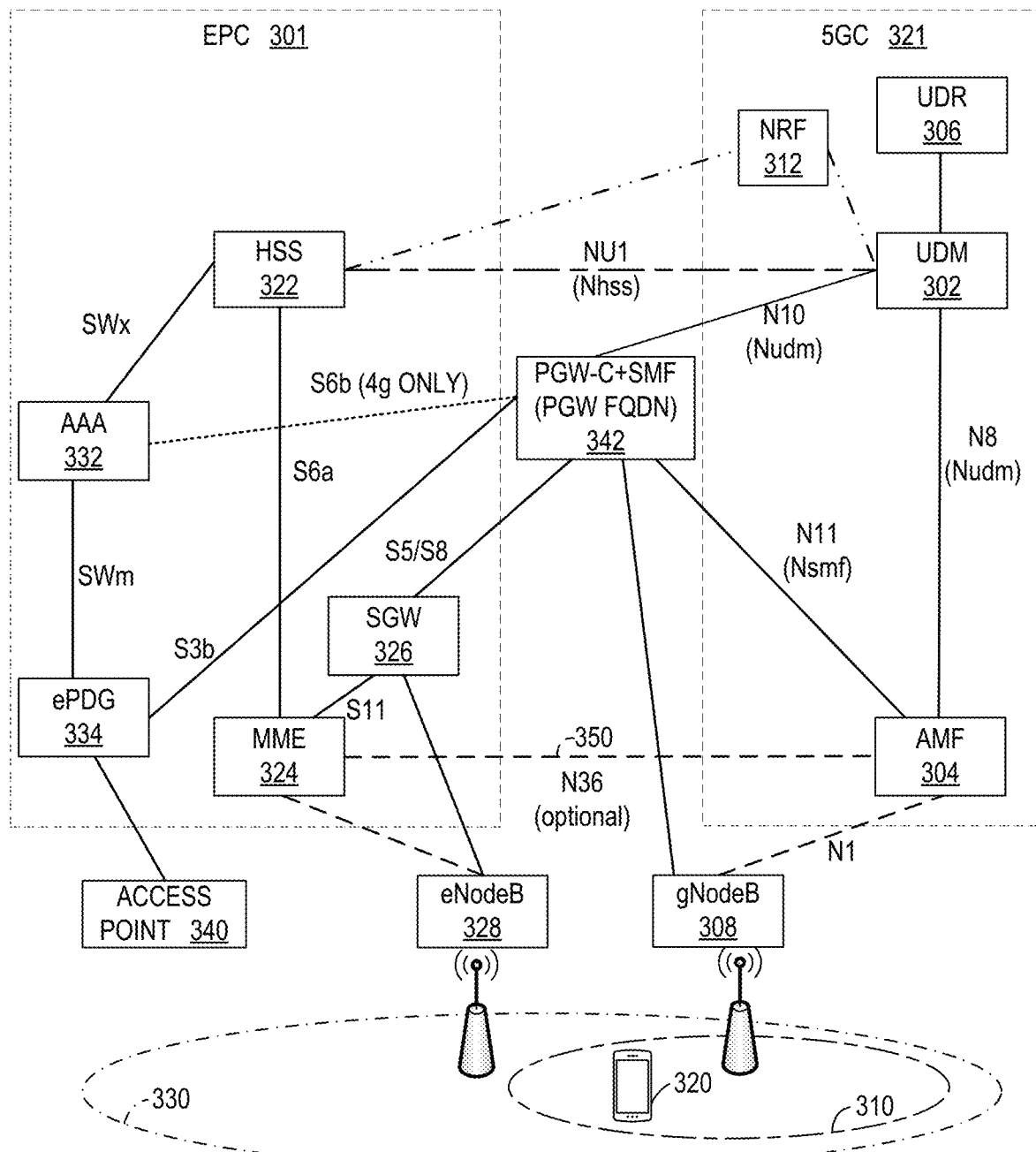
FIG. 3 illustrates an example of an interworking network architecture comprising Network Functions related to an Evolved Packet Core and a 5G Core, in accordance with the present disclosure.

FIG. 3 illustrates an example of an interworking network architecture 300 for EPC and 5GC, in accordance with various examples of the present disclosure. In an example, a service provider may deploy a 5G communication system in conjunction with a 4G communication system. As discussed in some prior examples, an EPC (e.g., an EPC 321) may include various network nodes, such as an HSS 322, an MME 324, and an SGW 326. Similarly, a 5GC (e.g., a 5GC 301) may include various network nodes/Network Functions, such as an AMF 304 and a UDM 302. Further, the network architecture 300 may include interworking functions, such as a "combined Control plane Packet Data Network Gateway (PGW-C) and Session Management Function (SMF)" (hereinafter referred to as 'PGW-C+SMF' for brevity). The PGW-C can be a point of interconnection between EPC and other/external IP networks. The SMF may perform Session Management (e.g., session establishment, modification, and/or release), an IP address allocation & management of a UE, etc.

In the ongoing example, the EPC 321 may further include an Authentication, Authorization, and Accounting (AAA) server 332, and an evolved Packet Data Gateway (ePDG) 334. In some examples, the AAA server 332 may provide UE authentication via an Extensible Authentication Protocol-Authentication and Key Agreement authentication (EAP-AKA). The ePDG 334 may provide a secure Wireless Local Area Network (WLAN) access to a UE (e.g., a UE 320). The ePDG 334 can act as a gateway for interconnecting the EPC 321 with a non-3GPP network, such as Wireless Fidelity (Wi-Fi). Non-3GPP networks may include an Institute of Electrical and Electronics Engineers (IEEE) 802.11 based Wireless Local Area Network (WLAN). Some of the non-3GPP networks can be of the untrusted category. A network may be categorized as 'untrusted' by a cellular service provider, and not by a 3GPP standard. In an example, a WLAN can be a non-3GPP network from which a UE may move to 4G. The WLAN may include an access router (not shown) with gateway functionality. The UE 320 may communicate with the access router via an Access Point (AP) 340. An AP can be a hardware device that enables UEs to connect to a network.

Further, the EPC 321 may include the MME 324 and the SGW 326 that may be coupled to a transceiver station 328 (e.g., eNodeB). As schematically illustrated in FIG. 3, a first region 310 may indicate a geographical region covered by the transceiver station 328 and the UE 320 may wirelessly connect to the transceiver station 328 when within the first region 310. Similarly, a second region 330 may indicate a geographical region covered by a transceiver station 308 (e.g., gNodeB) corresponding to the 5G communication system. The transceiver station 308 may be coupled to the AMF 304 and the PGW-C+SMF 342. The UE 320 may be wirelessly connected to such transceiver station 328 when operating from the second region 330.

Now referring to the 5GC 301, it may further include a Unified Data Repository (UDR) 306, and an NRF 312. In an example, the UDR 306 may store and retrieve subscription data from the UDM 302. An NRF can provide an NF service registration and discovery, enabling NFs to identify appropriate services in one another. In some examples, an NF registered at an NRF may include parameter(s) associated with a Network Function instance. The parameters may include a Fully Qualified Domain Name (FQDN) or Internet Protocol (IP) address to reach an NF instance.

The interworking network architecture 300 may use one or more interfaces for communication between various network nodes of the network architecture. NU1, N8, N10, and N11 are some examples of interfaces. Herein, the NU1 interface may indicate an interface between the HSS 322 and the UDM 302. N1 interface may be a reference point for connection between a UE and the AMF 304, and for carrying signals between them. N8 may be a reference point for connection between the AMF 304 and the UDM 302. N10 may be a reference point for connection between the SMF and the UDM 302. N11 may be a reference point for connection between the AMF and the SMF. N12 may be utilized by the AMF for authentication of a UE. Further, N14 (not shown in the illustrative example) may be a reference point for connection between different AMFs. N35 may be an interface between the UDM 302 and the UDR. N26 may be an interface between the MME 324 and the AMF 304. According to further examples, a service that an NF may provide to other NF can be via a service-based interface. Typically, a service-based interface may be indicated by the alphabet "N" followed by a reference of the NF in lower case (e.g., Nhss).

Similarly, network nodes of the EPC 321 may include various reference points/interfaces, such as an S2b interface between the ePDG 334 and the PGW-C+SMF 342, an S6a interface between the HSS 322 and the MME 324, an S6b interface may be between the AAA and PGW-C+SMF 342 for 4G, Swm interface between the ePDG 334 and the AAA server 332, an SWx interface between the AAA server 332 and the HSS 322. Further, an S11 reference point may provide a control plane between the SGW 326 and the MME(s) 324.

In some examples, interworking may occur in absence of an interface between the MME 324 and AMF 304. For session continuity (e.g., for preserving IP address), HSS 322 and UDM 302 may store and/or fetch PGW-C+SMF information and/or APN information. In an example, network architecture 300 may include an NF, such as a Network Repository Function (NRF) 312 that can be used for discovery and communication between HSS 322 and UDM 302. The NRF 312 may receive an NF-Discovery Request from an NF instance. Upon discovery, the NRF 312 may provide discovered information to a requesting NF. In an example, the HSS 322 may register in the NRF 312 for HSS discovery. The UDM 302 302 may send a request to the NRF 312 to discover HSS instance(s). The NRF 312 312 may respond to the UDM 302 with a Fully Qualified Domain Name (FQDN) of corresponding HSS based on an HSS discovery. In some examples, an HSS profile may include information corresponding to services offered or exposed by an NF. The UDM 302 may select an HSS instance based on the available HSS instances (obtained from the NRF 312 or locally configured). In some examples, the UDM 302 may store returned HSS instances and their NF profiles for subsequent use. Thus, instead of HSS waiting to be notified, UDM may push/register the session information in HSS. In some examples, session information (e.g., PDU session) may be created/changed in an AMF/SMF, and the AMF/SMF may register the session information in UDM. Then, the UDM 302 may pass the session information to the HSS 322. The proposed mechanism may reduce a UE registration time significantly, e.g. by 15-50 times as much as compared to some of the existing processes of retrieval and/or subscription to be notified, thereby reducing delays.

Figure 4:
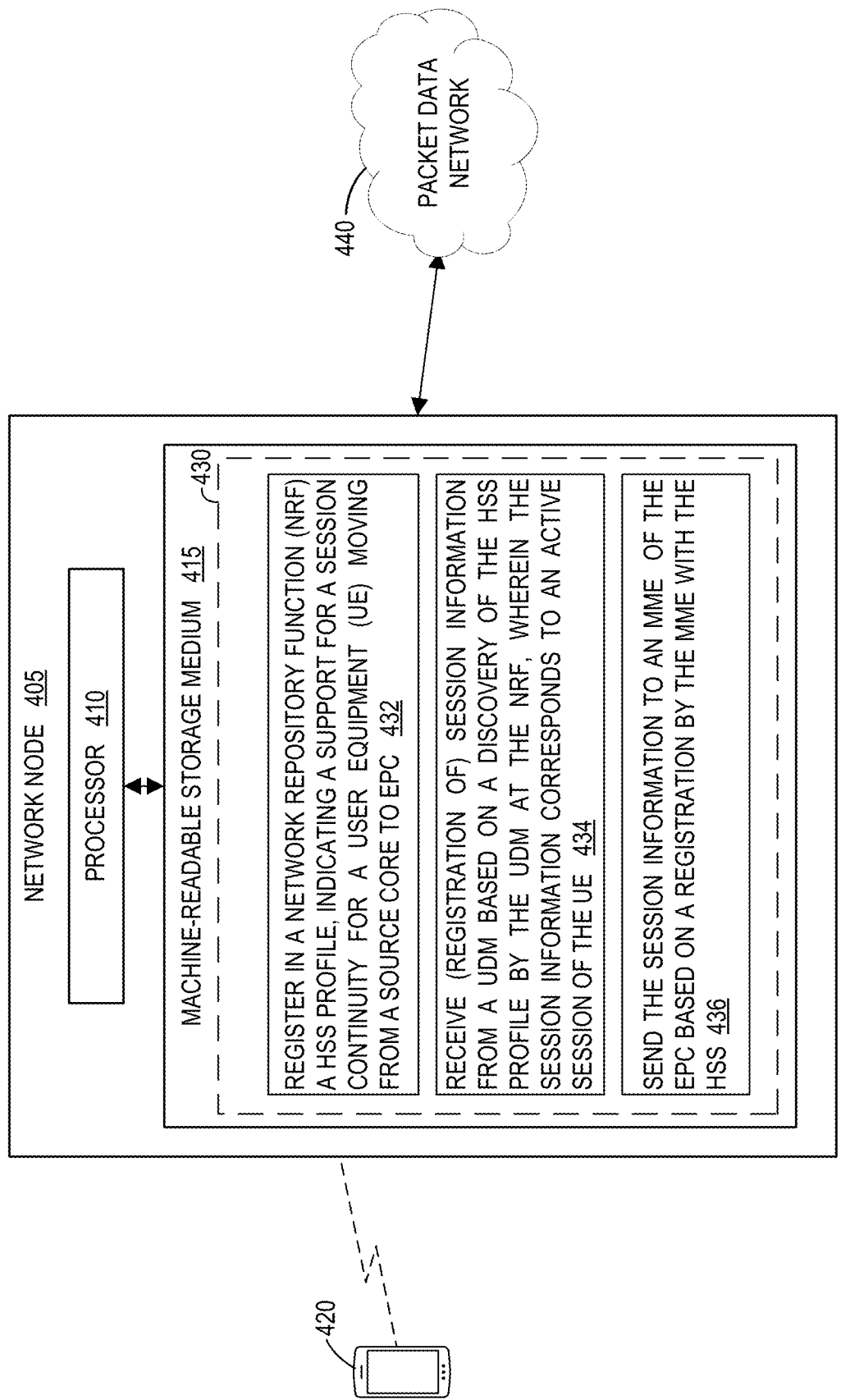
FIG. 4 illustrates a schematic view of an interworking system in a network architecture, according to various examples of the present disclosure.

FIG. 4 illustrates a schematic view of a network node 405 in a network architecture 400, according to some examples of the present disclosure. The network node 405 may correspond to a telecommunication service provider that provides a 5G communication system in conjunction with a 4G communication system. The network node 405 may be configured to run one or more network nodes/Network Functions. In some examples, at least one of an HSS, an MME, a AAA, an AMF, an NRF, and a PGW-C+SMF may be configured to run on the network node. The network node 405 may interact with a UE 420 via a transceiver station corresponding to at least one of 4G and 5G communication systems.

Further, the network node 405 may include a processor 410. The processor 410 may be a hardware processing resource, such as one or more Central Processing units (CPUs), semiconductor-based microprocessors, and/or other hardware devices suitable for retrieval and execution of the instructions 430. The processor 410 may fetch, decode, and execute instructions 430 stored in a machine-readable storage medium 415. As an alternative or in addition to retrieving and executing instructions, the processor 410 may include one or more electronic circuits that include electronic components for performing the functionality of one or more instructions, such as a field-programmable gate array (FPGA), application-specific integrated circuit (ASIC), or other electronic circuits.

In some examples, the machine-readable storage medium 415 may store instructions 430 (e.g., 432, 434, 436) executed by the processor 410 to perform the operations as described herein. The operations are not limited to a particular example described herein and may include additional operations such as those described in the illustrative examples of FIG. 1, 2, 3, 5, 6, 7, 8A, 8B, or 9.

The machine-readable storage medium 415 may be any electronic, magnetic, optical, or other physical storage device that contains or stores executable instructions. Thus, a machine-readable storage medium 415 may be, for example, Random Access Memory (RAM), non-volatile RAM (NVRAM), an Electrically Erasable Programmable Read-Only Memory (EEPROM), a storage device, an optical disc, and the like. In some examples, a machine-readable storage medium may be a non-transitory storage medium, where the term "non-transitory" does not encompass transitory propagating signals.

Referring now to the instructions 430, instructions 432 may be executable by the processor 410, and, when executed, may cause the processor 410 to register an HSS profile in an NRF, indicating support for session continuity when the UE 420 is moving from a source core (e.g., 5GC) to EPC. For example, the instructions may cause the process to enable an HSS instance that manages a user subscription to register the HSS profile with the NRF. As discussed earlier, the HSS may store records (e.g., device information, subscriber accounts, or service profile records) associated with UEs, for authentication, and authorization to enable access to communication services. In some examples, "HSS profile" may include records for identification, subscription, network location (e.g. attachment to a base station and/or MME), and/or IP address assignment information.

In some examples, instructions 434 may cause the processor 410 to receive a registration of session information from a UDM. The session information may correspond to an active session (e.g., an ongoing PDU session). The session information may be registered with the UDM. In an example, the session information may be registered by SMF-registration along with PDU session ID. According to some examples, the session information may be registered with UDM in response to at least one of creation or change of a PDU session at an SMF.

In some examples, instructions 436 may cause the processor 410 to send the session information to an MME based on a registration of the MME thereby maintaining the active session of the UE without interruption. In some further examples, instructions may cause the processor 410 to receive APN and/or PGW FQDN information for supporting session continuity. For interworking in the absence of an N26 interface, IP address preservation may be achieved by storing and fetching PGW-C+SMF and corresponding APN/DNN and/or PGW FQDN information through HSS and UDM. According to various examples, NFs discussed herein (e.g., HSS, UDM, PGW-C+SMF, NRF, etc.) may be based on a Software-Based Architecture (SBA) that may be deployed on the network node 405.

Figure 5:
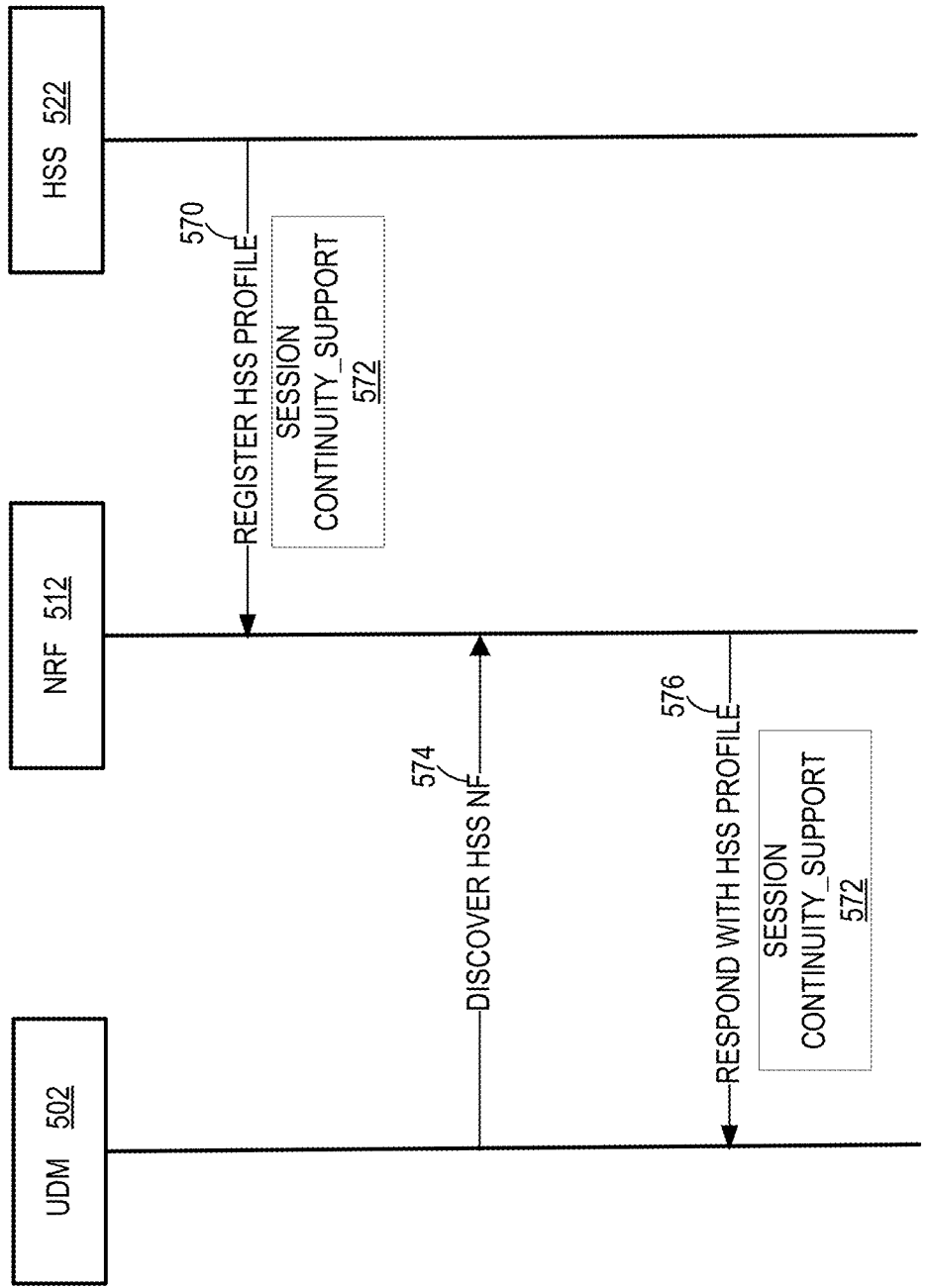
FIG. 5 illustrates a schematic view of registration and discovery of an HSS profile, according to various examples of the present disclosure.

FIG. 5 illustrates a schematic view of registration and discovery of a subscription profile, in accordance with various examples of the present disclosure. In an internetworking configuration 500, a UE may move from a 5GC to an EPC and an interface between an AMF of the 5GC and an MME of EPC may be absent. According to some examples, an HSS 522 may register a subscription profile 570 (e.g., an HSS profile) of a UE with a Network Repository Function (NRF) 512. In an example, a subscription profile may contain HSS capability, which may be different from a UE subscription. The registration of the subscription profile may also include indicating support for an interworking session continuity 572 with the NRF 512. In some examples, the subscription profile can be an HSS profile.

Further, a UDM 502 may discover 574 the subscription profile (e.g., discover HSS NF) based on the registration of the subscription profile with the NRF 512. Then, the NRF 512 may respond 576 to the UDM 502 with the subscription profile (e.g., the HSS profile), which may indicate the HSS support for interworking session continuity 572. The discovery of the subscription profile may form part of the techniques discussed in examples of FIG. 6 and FIG. 7 and may be referred to as "discover HSS."

Figure 6:
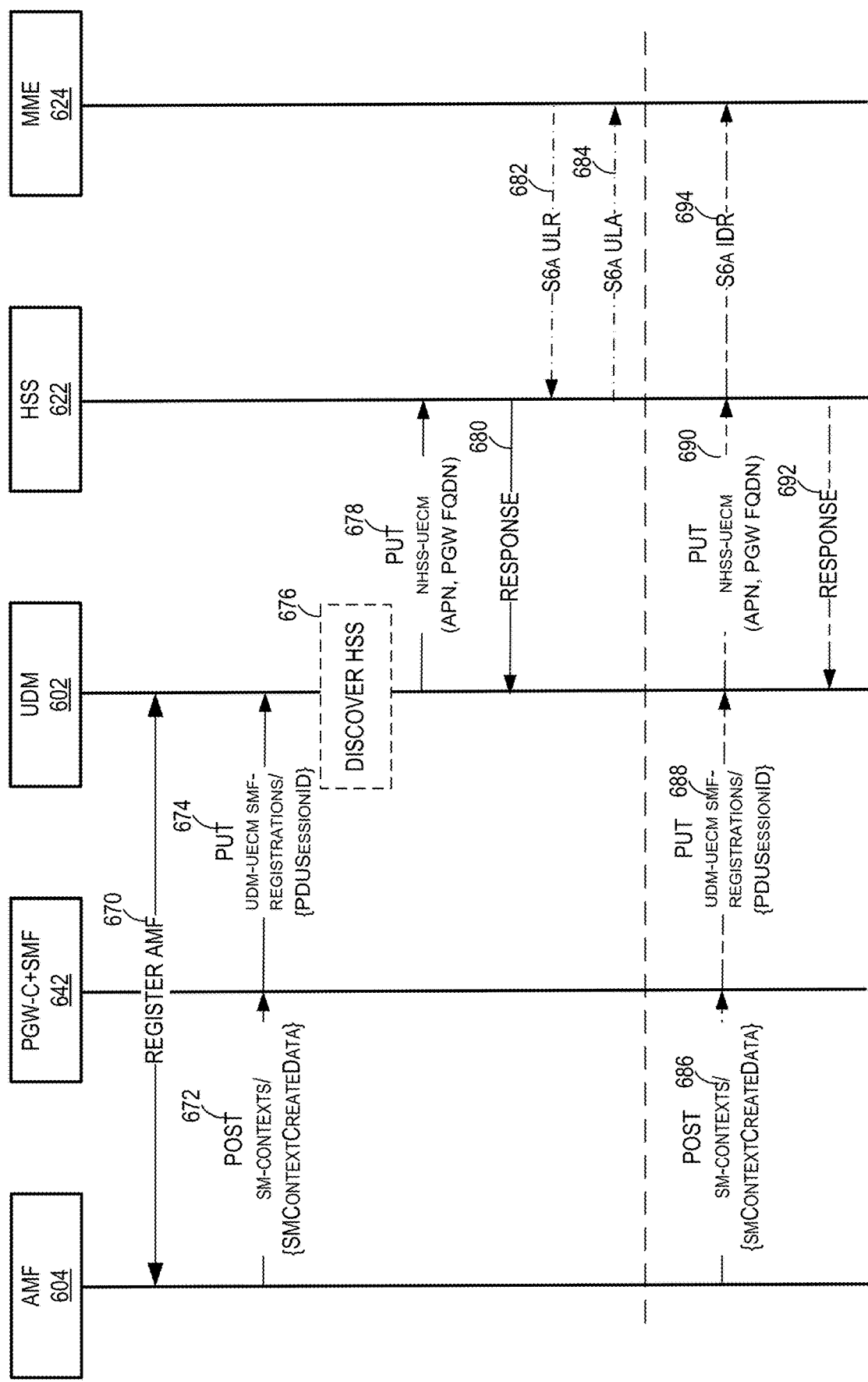
FIG. 6 illustrates a schematic view of a message sequence for session continuity during mobility of a User Equipment from 5G Core to Evolved Packet Core, according to various examples of the present disclosure.

FIG. 6 illustrates a schematic view of a message sequence for session continuity during mobility of a UE from 5GC to EPC, in accordance with various examples of the present disclosure. For example, a session may correspond to a data session created by a UE when connected to a 5G communication network. In an example, when a UE is connected to 5GC, a PGW-C+SMF (e.g., a PGW-C+SMF 642) may store in a UDM (e.g., a UDM 602) a PGW-C+SMF Fully Qualified Domain Name (FQDN) and/or APN information during a registration in the UDM. In some examples, the AMF may notify the UDM to store an association between Data Network Name (DNN) (akin to Access Point Name (APN) in 5GC) and PGW-C+SMF FQDN for interworking support. Herein, Data Network Name (DNN) may refer to a name of a Data Network (DN) to which a PDU session provides connectivity.

Referring to the ongoing example, during mobility from 5GC to EPC, a UE may move out of the coverage area of the 5G communication system into the coverage area of the 4G communication system, and it may attach to the EPC. In other words, the UE may move to an area under the coverage of a transceiver station that enables the exchange of information between the UE and the EPC. As discussed earlier, the transceiver station may be connected to an MME 624.

According to some examples, the UE may connect to the 5G communication system. Specifically, the UE may attach to an AMF 604. The AMF 604 may register AMF instance 670 with the UDM 602. The AMF 604 may receive at least one of a connection and a session information related to the UE from the UDM 602. The UE may create a session at the AMF 604. For instance, a PDU session may be established based on a request from a UE.

The AMF 604 may send a POST request/message 672 to the PGW-C+SMF 642. According to some examples, the POST request 672 may refer to an existing PDU session. The POST request may include a representation of an individual Session Management (SM) context resource to be created. Thus, the POST request 672 may include sm-contexts/{smContextCreateData} fields that may be used to create a Session Management (SM) context for the ongoing PDU session at the PGW-C+SMF 642, as the SM context may manage the PDU session. In some examples, the POST request may be a Hypertext Transfer Protocol (HTTP) request and a body of the HTTP request may include details of the SM context being created. The {SmContextCreateData} information may include information for creating the SM contexts. These details may be in a {SmContextCreateData} structured data type in a JSON document. In some examples, an individual SM context may be created for various PDU sessions. The PDU session may correspond to a PDU connectivity service that enables exchange of PDUs between a UE and a Data Network (DN) identified by a Data Network Name (DNN).

In some examples, PGW-C+SMF 642 may authenticate and validate the POST request. Based on the availability of resources, the PGW-C+SMF 642 may create an SM context. For example, the resources may correspond to NF resources that handle an SM context. Further, the PGW-C+SMF 642 may send a PUT request to the UDM 602. For example, the PUT request/message 674 may correspond to a udm-uecm SMF-registration. The PUT request 674 may include a PDU Session identifier (ID) that corresponds to the ongoing PDU session. A PGW-C+SMF instance may register an ongoing PDU session of the UE with the UDM 602. Herein, the terms 'POST' and 'PUT' may be analogous to 'create' and 'update', respectively.

Further, the UDM 602 may discover an HSS profile (e.g., HSS discovery) 676, and such discovery may be due to the HSS registering the HSS profile with an NRF, as illustrated in the example of FIG. 5. Based on the HSS discovery 676 and upon completion of registration of SMF (e.g., SMF registration via PUT message 674), the UDM 602 may send a PUT request to the HSS 622 with an nhss-uecm message. The PUT request 678 may include registering the session information with the HSS 622. Registering the session information may, in some examples, include updating the HSS 622 with an Access Point Name (APN) and/or a PGW FQDN information associated with the ongoing PDU session. In further examples, such registration may enable updating UE's IMEI with the HSS 622. The HSS 622 may respond (e.g., send RESPONSE) 680 to the UDM 602. The HSS 622 may store the session information, irrespective of registration of an MME. In some examples, the HSS 622 may update the UDR with the session information and may read subscription information related to the IMSI from the UDR.

During mobility, when the UE attaches to the EPC, the MME 624 may send an Update-Location-Request (ULR) 682 containing an IMSI of the UE. In other words, the HSS 622 may receive an S6a ULR request from the MME 624. Herein, the S6a reference point may be interfacing between an HSS and an MME. The S6a reference point may be used for registering location changes of the MME. This subscription information may indicate whether the UE has any restriction in 5GC. For example, the subscription information may indicate whether the UE has a 5G subscription or not. Based on the MME 624 registering with the HSS 622, the HSS 622 may respond to the MME 624 with an S6a Update-Location-Answer (ULA) 684. In some examples, the HSS 622 may determine that the subscriber can be allowed to use data based on IMSI subscription information. The HSS 622 may send session information and/or subscription information to the MME 624.

Steps 686-592 may correspond to a further example when an MME 624 may be registered with an HSS 622, and the UE may be operating in a dual registration mode. In dual registration mode, the UE may register in 5GC and EPC, either independently or at the same time. Thus, session information may be sent to the MME 624 independent of utilizing HSS discovery, especially in instances, such as dual registration mode. For example, steps POST 686, PUT 688, PUT 690, and RESPONSE 692 may be similar to the steps POST 672, PUT 674, PUT 678, and RESPONSE 680 discussed earlier. As the MME 624 has registered with HSS 622, the HSS 622 may send 694 MME an S6a Insert-Subscriber-Data-Request (IDR) message. In some examples, the HSS 622 may send this message when an attached UE changes subscriber profile, then an updated profile may be communicated to the MME 624.

Figure 7:
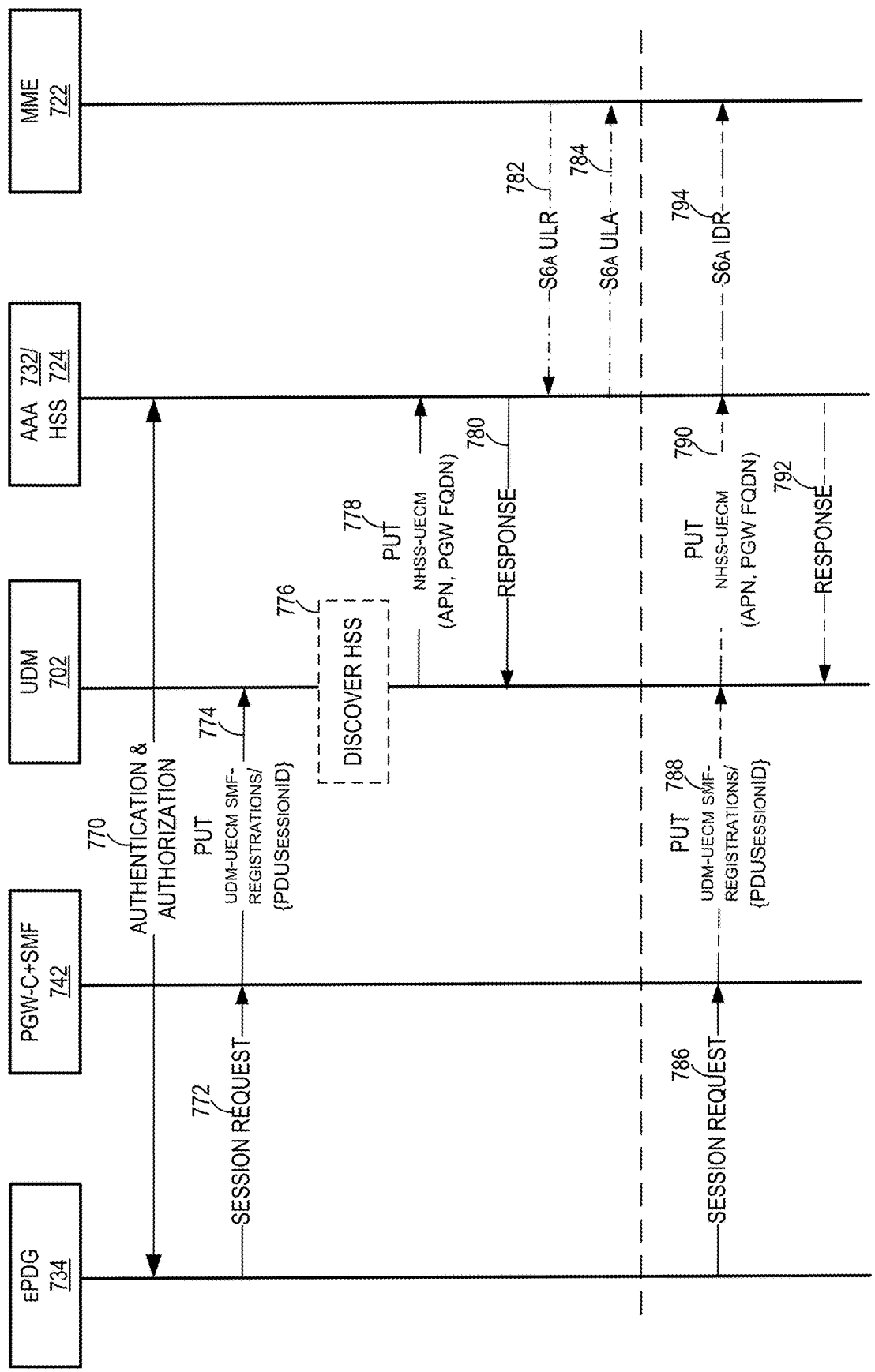
FIG. 7 illustrates a schematic view of a message sequence for session continuity during mobility of a User Equipment from a non-3rd Generation Partnership Program network to Evolved Packet Core, according to various examples of the present disclosure.

FIG. 7 illustrates a schematic view of a message sequence for session continuity during mobility of a UE from a non-3GPP network to a 4G communication system, in accordance with various examples of the present disclosure. The interworking system comprises an Evolved Packet Data Gateway (ePDG) 734, which may enable interworking between the non-3GPP network and EPC. These non-3GPP networks may include a Voice over Wireless Fidelity (Vo-WiFi), a public Wireless Fidelity (Wi-Fi) hotspot, etc.

In the ongoing example, when a UE is connected to a non-3GPP network (e.g., VoWiFi), the UE may attach to an ePDG 734. During mobility, the UE may attach to EPC, and the ePDG 734 may send 770 an authentication and authorization message to an Authentication, Authorization, and Accounting (AAA) server 732 and/or an HSS 724. The AAA server 732 or the HSS 724 may send a response to ePDG 734. Further, the UE may initiate a session at the ePDG 734. The ePDG 734 may add a session context 772 in the PGW-C+SMF 742. Further, the PGW-C+SMF 742 may send a PUT message to the UDM 702 for registration. For example, the PUT message 774 may correspond to a udm-uecm SMF-registration. This PUT message may enable registration of an SMF that is serving the PDU session on the UDM 702. The PUT message 774 may include a PDU Session ID that corresponds to the ongoing PDU session.

The UDM 702 may discover HSS profile 776, and such discovery may be due to the HSS registering the HSS profile with an NRF, as illustrated in the example of FIG. 5. Based on the discovery of HSS profile 776 and upon completion of registration of SMF (e.g., SMF-registration via PUT message 774), the UDM 702 may register the session information with the HSS 724. In an example, the UDM 702 may send a PUT message, such as nhss-uecm. The PUT message may include updating the HSS 724 with an Access Point Name (APN) and/or a PGW FQDN information corresponding to the ongoing session. The PGW-C+SMF 742 may use the PUT request to update the UE's IMEI with the HSS 724. The HSS 724 may respond to the request (e.g., POST message) sent by the UDM 702.

Similar to example of FIG. 6, during mobility, when a UE attaches to an EPC, the MME 722 may send 782 an S6a ULR containing an IMSI of the UE. Based on the MME 722 registration with the HSS 724, the HSS 724 may respond 784 to the MME 722 with an S6a ULA.

Steps 786-692 may correspond to a further example, where an MME 722 may be registered with an HSS 724, and the UE may operate in a dual registration mode of operation. Thus, HSS 724 and/or AAA server 732 may send session information to the MME 722. For example, steps for session request 786, PUT 788, PUT 790, and RESPONSE 792 may be similar to the steps for session request 772, PUT 774, PUT 778, and RESPONSE 780 discussed earlier. In an example, the UDM 702 may cache discovered the HSS profile. Further, as the MME 722 may register with HSS 724, the HSS 724 may send 794 MME an S6a IDR message.

Figure 8A:
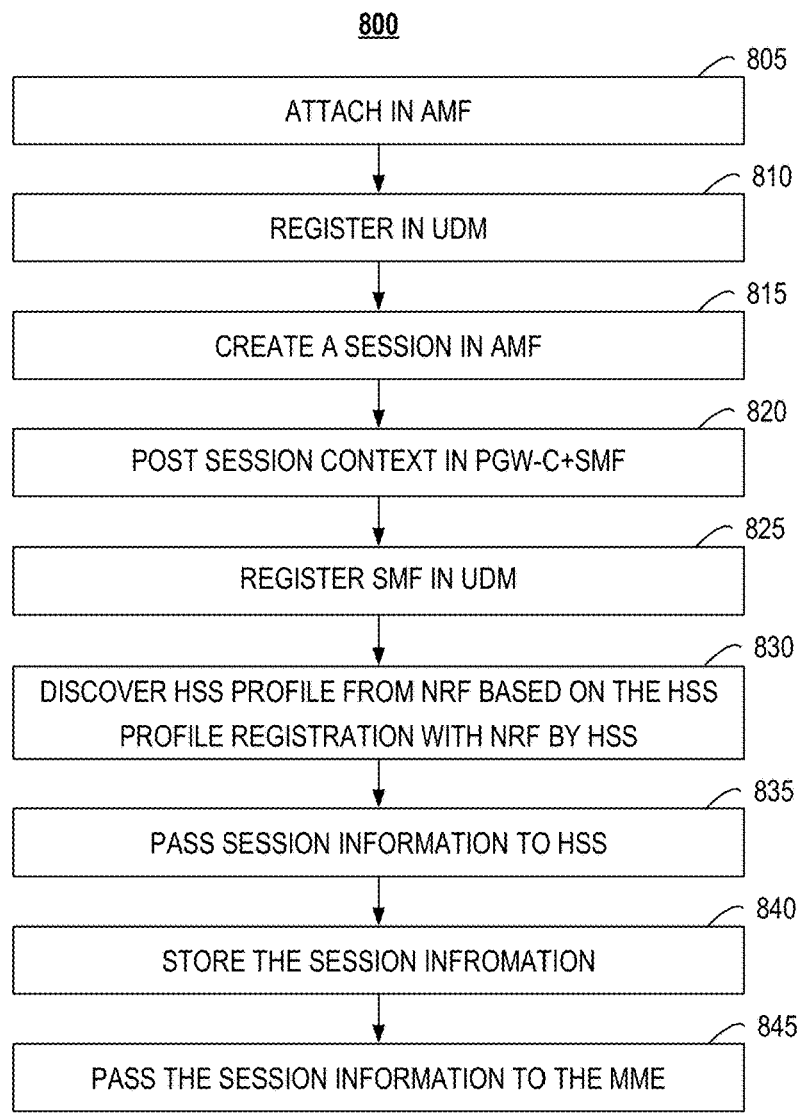
FIG. 8A illustrates an example flow diagram involving techniques for session continuity during mobility of User Equipment to Evolved Packet Core, in accordance with the present disclosure.

FIG. 8A illustrates an example flow diagram 800 involving techniques for session continuity during mobility of UE to EPC, according to the present disclosure. The flow diagram 800 can be performed when a UE moves from 5GC/non-3GPP network to EPC. Accordingly, flow diagram 800 is illustrated as a flow chart comprising blocks 805-845 indicating the process for session continuity during the mobility of a UE from 5GC to EPC. In some examples, the flow diagram 800 may include more or fewer blocks than are shown. Further, in some other examples, one or more of the blocks of the flow diagram 800 may, at certain times, be ongoing and/or may repeat. Furthermore, in some examples, two or more blocks of the flow diagram 800 may be combined. The flow diagram 800 may be implemented as a method At block 805, a UE may attach to a core (e.g., a 5GC or a non-3GPP communication system). Specifically, the UE may attach to an AMF of the 5GC. The AMF may authenticate and authorize access requests, mobility management, and other actions defined by the 3GPP Technical Specification (TS) 23.501.

At block 810, the AMF may register at the UDM. According to some examples, the AMF may select a UDM and register the UE with the UDM using "Nudm_UECM_Registration" message. The UDM stores the AMF identity and responds to the AMF request. The AMF may request access and mobility subscriptions from UDM. The UDM may store the AMF identity and respond to the AMF request.

At block 815, the UE may create a session at the AMF. The UE may receive data service(s) via a PDU session. The PDU session may act as a logical connection between the UE and core. The UE may create a PDU session for accessing services. In some examples, the UE may establish a PDU session when a service is to be used by a user, whereas, in EPC, the UE may establish a PDU session when registering with a network.

At block 820, the AMF may register a session context (e.g., an SM context) in SMF/PGW-C+SMF. A session context may create an association between a PDU session and an AMF that is serving the UE. In an example, the session context may include one or more parameters that govern the PDU session.

At block 825, the SMF/PGW-C+SMF may perform SMF-registration by registering the session information with the UDM. In an example, the SMF/PGW-C+SMF may be a control function that manages various user sessions including establishment, modification, and release of sessions. In a further example, the SMF/PGW-C+SMF may allocate IP addresses for certain PDU sessions.

At block 830, UDM may discover the HSS profile that aids in discovering an HSS instance that manages the user subscription in EPC. In other words, the UDM may utilize the NRF to discover the HSS instance. The discovery of the HSS profile may be based on registration of an HSS profile with an NRF, indicating support for session continuity during mobility of UE to EPC. As discussed earlier, support for session continuity can be indicated in the HSS profile and the HSS profile registered in NRF can be a pre-condition for flow diagram 800, per an example.

At block 835, the UDM may pass the session information to the HSS for session continuity. The UDM may utilize the NRF to identify the HSS instance based on HSS profile registration in the NRF. For example, the UDM may register/send session information along with APN, PGW FQDN, etc. with the HSS.

At block 840, the HSS may store session information, irrespective of registration from the MME. For example, even before an MME registration with the HSS, the HSS may store the session information.

At block 845, the HSS may register/pass the session information to the MME. According to some examples, the HSS may send an s6a Insert Subscriber Data Request (IDR) to the MME that may be serving the UE. In a further example, the HSS may check if the MME is registered with the HSS. Based on a determination that the MME is registered, the HSS may pass the session information to the MME.

Figure 8B:
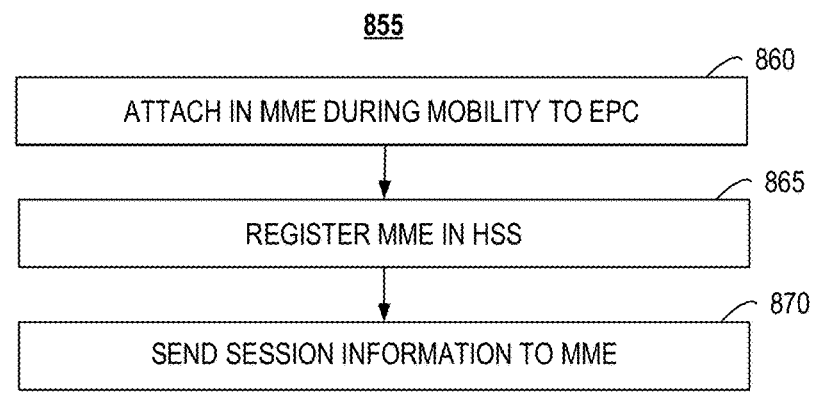
FIG. 8B illustrates a flow diagram of an example for passing session information, according to the present disclosure.

FIG. 8B illustrates a flow diagram 855 of an example for passing session information, according to the present disclosure. At block 860, the UE may attach to an EPC during mobility from one of the 5G or non-3GPP communication networks. For example, the UE may be handed over from AMF to MME or from ePDG to MME based on a source communication system. In some examples, a standardized inter-core interface, such as N26 or the like may be used. In some examples, such as the ongoing example, a standardized interface may not be available between cores. At block 865, the HSS may identify a registration of MME with the HSS. According to some examples, the MME may initiate an s6a Update-Location Request. At block 870, the HSS may send session information to the MME.

Figure 9:
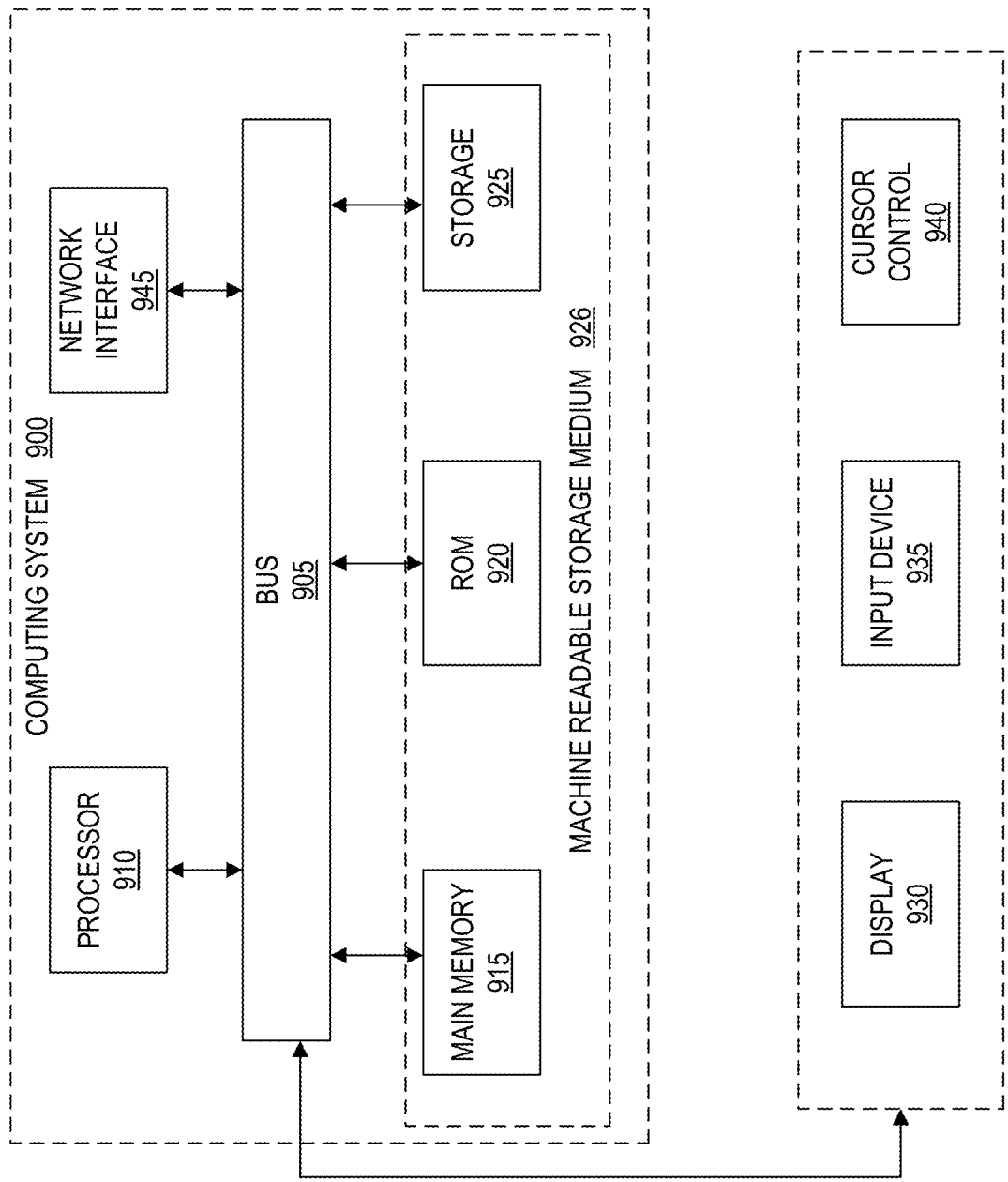
FIG. 9 illustrates an example computing system that may be used in implementing various examples discussed herein.

FIG. 9 depicts a block diagram of an example computing system 900 in which at least a portion of the disclosed authenticator system/method may be implemented. Furthermore, it should be appreciated that although the various instructions are illustrated as being co-located within a single processing unit, such as the processor 410 (shown in FIG. 4), in implementations in which processor(s) may include multiple processing units, one or more instructions may be executed remotely from the other instructions.

The computing system 900 may include a bus 905 or other communication mechanisms for communicating information, one or more hardware processors 910 coupled with bus 905 for processing information. Hardware processor(s) 910 may be, for example, one or more general-purpose microprocessors.

The computing system 900 also may include a main memory 915, such as a random access memory (RAM), cache, and/or other dynamic storage devices, coupled to bus 905 for storing information and instructions to be executed by the processor 910. Main memory 915 also may be used for storing temporary variables or other intermediate information during the execution of instructions to be executed by processor 910. Such instructions, when stored in storage media accessible to processor 910, render computing system 900 into a special-purpose machine that is customized to perform the operations specified in the instructions.

The computing system 900 further may include a read-only memory (ROM) 920 or other static storage device coupled to bus 905 for storing static information and instructions for processor 910. A storage device 925, such as a magnetic disk, optical disk, or USB thumb drive (Flash drive), etc., is provided and coupled to bus 905 for storing information and instructions.

The computing system 900 may be coupled via bus 905 to a display 930 for displaying information to a computer user. An input device 935, including alphanumeric and other keys, is coupled to bus 905 for communicating information and command selections to processor 910. Another type of user input device is a cursor control 940 for command selections to processor 910. This and other modules may include, by way of example, components, such as software components, object-oriented software components, class components, task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language, for example, BASIC, Perl, or Python. It will be appreciated that software components may be callable from other components or from themselves, and/or may be invoked in response to detected events or interrupts. Software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

According to one example, the techniques herein are performed by computing system 900 in response to processor(s) 910 executing one or more sequences of one or more instructions contained in main memory 915. Such instructions may be read into main memory 915 from another storage medium, such as storage device 925. Execution of the sequences of instructions contained in main memory 915 causes processor(s) 910 to perform the process steps described herein. In alternative examples, hard-wired circuitry may be used in place of or in combination with software instructions.

The computing system 900 also may include a network interface 945 coupled to bus 905. Network interface 945 provides a two-way data communication coupling to one or more network links that are connected to one or more local networks. For example, the network interface 945 may be a local area network (LAN) card to provide a data communication connection to a compatible LAN (or WAN component to communicate with a WAN). Wireless links may also be implemented. In any such implementation, network interface 945 may send and receive electrical, electromagnetic, or optical signals that carry digital data streams representing various types of information. The signals through the various networks and the signals on the network link and through the network interface 945, which carry the digital data to and from the computing system 900, are an example of forms of transmission media.

In some examples, the machine-readable storage medium 926 (e.g., one or more of the main memory 915, the ROM 920, or the storage device 925) may store instructions that when executed by the processor 910 may cause the processor 910 to execute methods described in FIGS. 1-8. Some examples of instructions that when executed by the processor 910 may cause the processor 910 to register in an NRF an HSS profile, indicating support for a session continuity for a UE moving to EPC. The instruction may cause the processor 910 to receive registration of session information from a UDM. The session information corresponds to a PDU session that may be ongoing. The instructions may cause the processor 910 to support session continuity based on the session information received from the UDM.

The computing system 900 can send messages and receive data, including program code, through the network(s), network link, and the network interface 945. In the Internet example, a server might transmit a requested code for an application program through the Internet, the ISP, the local network, and the network interface 945.

The received code may be executed by processor 910 as it is received, and/or stored in storage device 925, or other non-volatile storage for later execution. One or more of the processes, methods, and algorithms described in the preceding sections may be embodied in, and fully or partially automated by, code components executed by one or more computing systems or computer processors comprising computer hardware. The one or more computing systems or computer processors may also operate to support the performance of the relevant operations in a "cloud computing" environment or as a "software as a service" (SaaS). The processes and algorithms may be implemented partially or wholly in application-specific circuitry. The various features and processes described above may be used independently of one another or may be combined in various ways. Different combinations and sub-combinations are intended to fall within the scope of this disclosure, and certain methods or process blocks may be omitted in some implementations. The methods and processes described herein are also not limited to any particular sequence, and the blocks or states relating thereto can be performed in other sequences that are appropriate or may be performed in parallel, or in some other manner. Blocks or states may be added to or removed from the disclosed examples. The performance of certain operations or processes may be distributed among computing systems or computer processors, not only residing within a single machine but deployed across a number of machines. Where a circuit is implemented in whole or in part using software, such software can be implemented to operate with a computing or processing system capable of carrying out the functionality described with respect thereto, such as computing system 900.

As used herein, the term "or" may be construed in either an inclusive or exclusive sense. Moreover, the description of resources, operations, or structures in the singular shall not be read to exclude the plural. Conditional language, such as, among others, "can," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open-ended as opposed to limiting. Adjectives such as "conventional," "standard," "known," and terms of similar meaning should not be construed as limiting the item described to a given period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
   registering, by a destination subscription manager corresponding to a destination core, a subscription profile at a Network Repository Function (NRF) of an interworking network architecture, wherein the subscription profile indicates support for a session continuity for a User Equipment (UE) during mobility of the UE from a source core to the destination core;
   receiving, by the destination subscription manager, session information from a source subscription manager of the source core based on a discovery of the subscription profile at the NRF, wherein the session information corresponds to an active network connection of the UE to the source core; and
   sending, by the destination subscription manager, the session information to a destination mobility manager of the destination core based on a registration by the destination mobility manager with the destination subscription manager,
   wherein the destination mobility manager registered with the destination subscription manager based on the mobility of the UE from the source core to the destination core, and wherein the destination subscription manager receives the session information from the source subscription manager prior to the UE attaching to the destination core.

2. The method of claim 1 further comprises:
   storing, by the destination subscription manager, the session information irrespective of the registration by the destination mobility manager with the destination subscription manager.

3. The method of claim 1, wherein the receiving the session information is in response to a Session Management Function (SMF)-registration in the source subscription manager, wherein the SMF-registration includes a session identifier (ID) corresponding to the active network connection.

4. The method of claim 3, wherein the active network connection is a Packet Data Unit (PDU) session, and the session ID is a Packet Data Unit (PDU) session identifier (ID).

5. The method of claim 1, wherein the receiving the session information includes:
   registering the session information with the destination subscription manager, wherein the session information includes an Access Point Name (APN) and a Packet Data Network Gateway (PGW) Fully Qualified Domain Name (FQDN) corresponding to a session.

6. The method of claim 1, further comprising:
   receiving the subscription profile from the NRF by the destination subscription manager based on a discovery of the subscription profile, wherein the subscription profile is a Home Subscriber Server (HSS) profile.

7. A network node comprising:
   a processor; and
   a machine-readable storage medium comprising instructions, the instructions executable by the processor that cause the processor to:
      register, by a Home Subscriber Server (HSS) of an Evolved Packet Core (EPC), a HSS profile in a Network Repository Function (NRF), wherein the HSS profile indicates support for a session continuity for a User Equipment (UE) during mobility of the UE from a source core to the EPC;
      receive, by the HSS, session information from a Unified Data Management (UDM) of the source core based on a discovery of the HSS profile at the NRF, wherein the session information corresponds to an active session of the UE with the source core; and
      send the session information to a Mobility Management Entity (MME) of the EPC based on a registration by the MME with the HSS,
      wherein the MME registered with the HSS based on the mobility of the UE from the source core to the EPC, and wherein the HSS receives the session information from the UDM prior to the UE attaching to the EPC.

8. The network node of claim 7, wherein the instructions executable by the processor that cause the processor to receive the session information, include:
   receive a PUT message with an nhss-uecm information, wherein the nhss-uecm information may include an Access Point Name (APN) and a Packet Data Network (PDN) Gateway Fully Qualified Domain Name (PGW FQDN).

9. The network node of claim 7, wherein the NRF is a Network Function in an interworking system, and the NRF enables a registration and discovery of a Network Function (NF) service, wherein the NF service is a Home Subscriber Server (HSS) profile.

10. The network node of claim 7, wherein: the network node is a Home Subscriber Server (HSS) of an Evolved Packet Core (EPC) corresponding to a Fourth Generation (4G) communication system, and the network node is deployed on at least one of a computing device, a physical server, a virtual server, and a Virtual Network Function (VNF).

11. The network node of claim 7, wherein the registration by the MME with the HSS includes instructions that cause the processor to:
   receive an Update-Location Request (ULR) along with an International Mobile Subscriber Identity (IMSI) of the UE; and
   send an Update-Location Answer (ULA) to the MME.

12. The network node of claim 7, wherein the instructions include further instructions executable by the processor that cause the processor to:
   send the MME a Fully Qualified Domain Name (FQDN) of a Packet Gateway (PGW) usable by the UE to access the active session.

13. The network node of claim 7, wherein the network node is part of an interworking network architecture between the EPC and a 5G Core (5GC) of a Fifth Generation (5G) communication system.

14. A non-transitory machine-readable storage medium storing instructions, the instructions, executable by a processor, to:
   register, by a destination subscription manager of a destination core, a subscription profile in a Network Repository Function (NRF), wherein the subscription profile indicates support for a session continuity for a User Equipment (UE) during mobility from a source core to the destination core, wherein the destination core is an Evolved Packet Core (EPC);
   receive, by the destination subscription manager, session information from a source subscription manager of the source core based on a discovery of the subscription profile at the NRF, wherein the session information corresponds to an active network connection of the UE to the source core; and
   send the session information to a destination mobility manager of the destination core based on a registration by the destination mobility manager with a destination subscription manager,
   wherein the destination mobility manager registered with the destination subscription manager based on the mobility of the UE from the source core to the destination core, and wherein the destination subscription manager receives the session information from the source subscription manager prior to the UE attaching to the destination core.

15. The non-transitory machine-readable storage medium of claim 14 includes further instructions to:
   register an Access and Mobility Management Function (AMF) instance with the source subscription manager by a source mobility manager.

16. The non-transitory machine-readable storage medium of claim 15 includes further instructions to:
   create a session at the source mobility manager of the source core by the UE, wherein the source core is 5G Core (5GC).

17. The non-transitory machine-readable storage medium of claim 16 includes further instructions to:
   post a session context in a combined Packet Data Network Gateway-Control and Session Management Function (PGW-C+SMF) by the source mobility manager.

18. The non-transitory machine-readable storage medium of claim 17 includes further instructions to:
   signal to the PGW-C+SMF by the source mobility manager, to create a Session Management (SM) context; and signal by the PGW-C+SMF to the source subscription manager regarding a Session Management Function (SMF) instance serving the session of the UE.

19. The non-transitory machine-readable storage medium of claim 14 includes further instructions to:
register by an evolved Packet Data Gateway (ePDG) to an Authentication, Authorization, and Accounting (AAA) server and a destination subscription manager for authentication and authorization of the UE, when mobility of the UE is from a non-third Generation Partnership Program (3GPP) to the EPC.

20. The non-transitory machine-readable storage medium of claim 19 includes further instructions to:
create a session at the ePDG of the source core by the UE;
add a session context by the ePDG in a combined Packet Data Network Gateway-Control and Session Management Function (PGW-C+SMF); and
register by the PGW-C+SMF a Session Management Function (SMF) instance serving the session at the source subscription manager.

* * * * *